United States Patent [19]
Kohler

[11] 3,758,252
[45] Sept. 11, 1973

[54] NOZZLE HEAD ASSEMBLY FOR INJECTION MOLD

[76] Inventor: Arthur Kohler, Willowick Towers, Apartment 511, 31900 N. Marginal Rd., Willowick, Ohio 44094

[22] Filed: Nov. 8, 1971

[21] Appl. No.: 196,536

[52] U.S. Cl. .......... 425/242, 425/247, 425/DIG. 228
[51] Int. Cl. ............................. B29f 1/02, B29f 1/03
[58] Field of Search .................... 425/191, 242, 247, 425/248, 250, 249, 245, 326, 464, 382, DIG. 224–DIG. 229, 207, 209

[56] References Cited
UNITED STATES PATENTS

| | | | |
|---|---|---|---|
| 3,568,256 | 3/1971 | Johnson | 425/191 |
| 3,094,604 | 7/1963 | Ackaret | 425/326 |
| 2,253,460 | 8/1941 | Hempel | 425/207 X |
| 2,433,065 | 12/1947 | Rubissow | 425/242 X |

FOREIGN PATENTS OR APPLICATIONS

1,194,138   11/1959   France .............................. 425/245

Primary Examiner—J. Spencer Overholser
Assistant Examiner—Michael O. Sutton
Attorney—William N. Hogg

[57]   ABSTRACT

A nozzle head assembly for plastic injection molding is provided which has a body with at least two nozzles secured thereto at one end. The other end of the head is provided with plastic receiving opening. Individual passages connect each plastic receiving opening with each nozzle. The nozzles are axially offset with respect to a plastic receiving opening and the passages are formed to a curved configuration to minimize turbulence.

4 Claims, 3 Drawing Figures

NOZZLE HEAD ASSEMBLY FOR INJECTION MOLD

BACKGROUND OF THE INVENTION

This invention relates generally to nozzle systems for injection molding, and more particularly to multiple nozzle systems for injection molding ultra high strength plastic which requires critical temperature and pressure control.

The development of ultra high strength plastics has provided a material which can be used for forming articles which heretofor have not been capable of being formed of plastic. However, the development of the high strength plastics such as Noryl, manufactured by General Electric Company, and Arylon T1801, manufactured by UniRoyal, has resulted in materials which have very close critical limits with respect to temperature and pressure at which molding must take place. These plastics must be heated to a very close precise temperature range and formed quickly in this range to assure adequate structure and surface properties. If the flow characteristics and temperature range of the material is not properly controlled conditions such as weld marks, heat sinks, and crazing are likely to occur. Also the material must be maintained as free of gas bubbles as possible to insure uniform density and structure.

In the case of single cavity molds the delivery of the plastic from the ejection cylinder of the machine to the mold cavity does not present any great problem since the sprew bushing of the mold cavity can be directly in line with the output screw of the molding machine. However, it is often desirable and even economically necessary to utilize multiple cavity molds to obtain maximum efficiency. In this case the sprew bushing for each cavity cannot be aligned with the output of the molding machine. Conventional prior art techniques in such cases have included the use of runners gated to each sprew bushing in an injection molding head. This technique, while satisfactory for lower strength plastics, is not satisfactory for the ultra-high strength plastics due to the cooling effect and the turbulent flow characteristics caused by the sharp angles of flow of the plastic on its journey from the machine to each of the cavities resulting in heat sinks, weld marks, and crazing. Also, prior art techniques have included the use of a head having individual nozzles feeding each of the multiple cavities, with passages connecting each nozzle to the output from the machine. These passages have taken the form of straight bores connecting each of the nozzles to the output of the machine. These also have not proven satisfactory due to the sharp angles involved where the passages meet the inlet and outlet openings for the plastic. These sharp angles cause a turbulence in the plastic which tends both to cool the plastic too rapidly and also which can result in entrapped gas which in turn results in poor structural quality of the molded product.

SUMMARY OF THE INVENTION

According to the present invention, a multiple nozzle injection molding head assembly is provided which includes a body mounting a plurality of nozzles. Each of the nozzles is offset from the plastic inlet opening to the body. Separate curved passages connect each nozzle with the inlet opening, the configuration of these passages being of a curveture which allows a smooth, non-turbulent flow from the inlet passage to each of the nozzles.

DESCRIPTION OF THE PREFERRED EMBODIMENT

Figure 1:
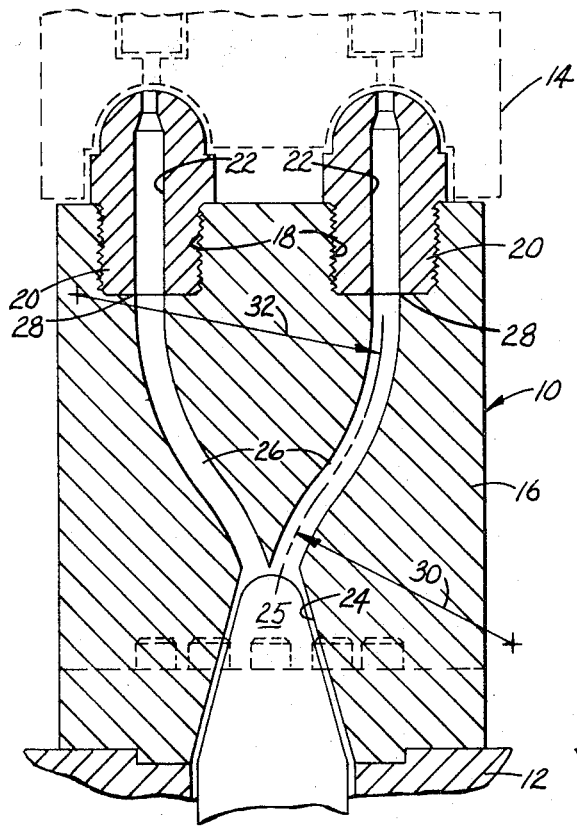
FIG. 1 is a sectional view showing a nozzle assembly according to this invention secured to an extrusion press and positioned to feed a multiple cavity mold.
Figure 2:
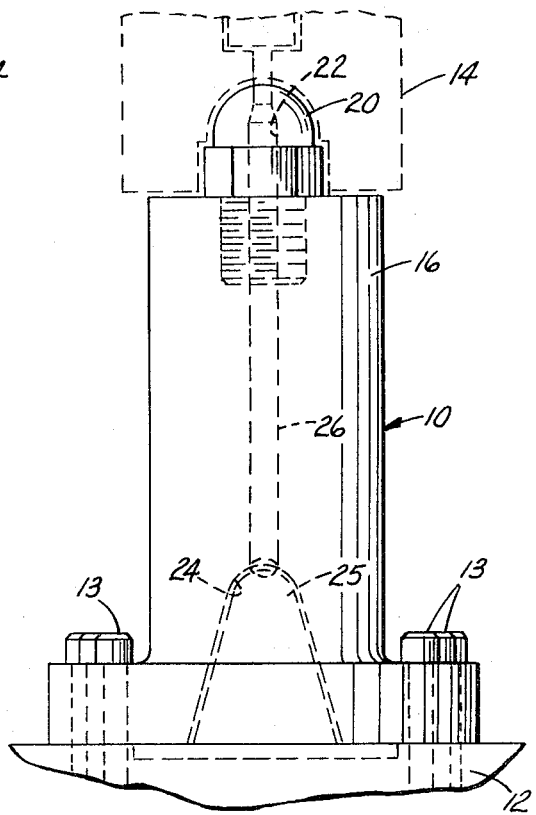
FIG. 2 is an elevational view of the device of FIG. 1 rotated 90°.

Referring now to the drawing, a nozzle head or assembly designated generally 10, formed according to this invention is shown. In FIGS. 1 and 2 the head 10 is shown secured to the cylinder of a molding machine shown fragmentarily at 12 by bolts 13 to receive the plastic therefrom, and in operational engagement with a multiple cavity mold designated as 14 shown in dotted outline. The machine 12 and the mold 14 do not per se form a part of the invention but are illustrated to give the general environment of the head 10.

The head 10 includes a body 16 of generally cylindrical configuration. At one end of the body 16 a plurality of nozzle receiving apertures 18 are provided in the form of threaded bottomed bores. The nozzle receiving apertures 18 each have a nozzle 20 threaded therein, and each nozzle has a through axial bore 22.

Figure 3:
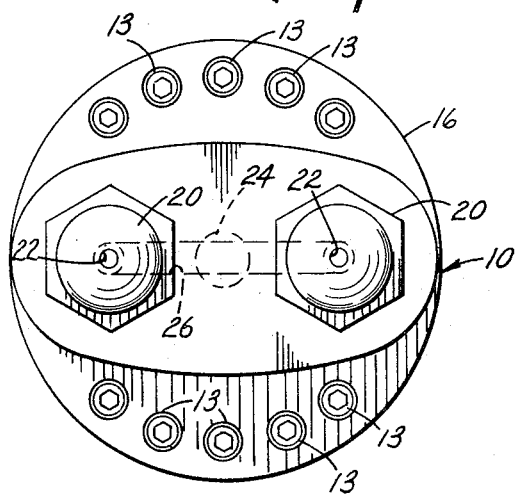
FIG. 3 is an elevational view of the device nozzle assembly.

At the opposite end of the body 16 from the nozzle receiving apertures there is formed a plastic receiving opening 24 of a generally conical configuration adapted to receive the top of the plastic conveying screw 25 of the machine 12 showing the screw in its full ejection position. As can be seen in FIGS. 1 and 3 the axial bores of the nozzles 22 are axially offset with respect to the axis of the plastic receiving opening 24.

In order to convey the plastic from the plastic receiving opening 24 to the nozzles 20 a plurality of passages 26 are provided, one connecting each nozzle receiving aperture 18 with the plastic receiving opening 24 in the head. These passages 26 are formed to a curved configuration extending from the plastic receiving opening 24 to their discharge openings 28 where they connect with the nozzle receiving apertures 18. This smooth curved configuration promotes a smooth rather than turbulent flow of fluid in the passages 26.

In the preferred embodiment this curved configuration of the passages 26 is formed as a compound curve of two segments. The first segment of each passage 26 extends from the plastic receiving opening 24 and is formed on the radius 30 of a circle which radius 30 extends to the side of a plastic receiving opening 24 on which the discharge opening of the passage 26 lies. The curve 26 also has a second segment extending from the discharge opening 28 to meet the first segment formed on radius 32 which lies on the side of the plastic receiving opening 24 away from the plastic discharge opening 28. The center of the radius 32 preferably is selected such that at the place where the passage 26 terminates in the discharge opening 28 the bore thereof is coaxial with the bore 22 in the nozzle 20. This configuration of a smooth compound curve will promote non-turbulent flow of the material from the plastic receiving opening 24 to the nozzles 20 for injection into the cavities of the mold. Thus speed of delivery is maximized and turbulence is minimized to achieve a sound product with superior surface qualities.

The invention has been illustrated in an embodiment employing two individual nozzles. It is to be understood, however, that it is not so limited to multiple nozzle systems of only two nozzles since it is adapted for a use with three or more nozzles. The criteria which dictates the usefulness of the invention is that condition wherein the nozzles must be axially offset with respect to the plastic receiving opening. In such case as arcuate configuration of the bores to provide a smooth flow of plastic according to this invention provides the superior results of the present invention.

What is claimed is:

1. In a plastic injection molding machine which has a plastic conveying screw having a tapered end portion, a feeding head comprising,
   a unitary body, means to secure said body to said molding machine to operate therewith as a unit,
   a plastic receiving opening formed in said body disposed to receive liquid plastic directly from said machine,
   at least two plastic discharge openings, at least one of said discharge openings being axially offset with respect to the plastic receiving opening, means to secure nozzles in each of said discharge openings,
   and individual passage means connecting said plastic receiving opening directly with each discharge opening, the plastic receiving opening having a tapered configuration conforming in shape to and being adapted to receive the tapered end portion of the screw in its ejection position, said taper extending to the location where said individual passage means connect with the receiving opening,
   the configuration of each passage means to each axially offset discharge opening having a curved configuration for smooth fluid flow from the receiving opening to the discharge opening.

2. The invention as defined in claim 1 wherein said curved configuration of each curved passage is a compound curve which has a first segment extending from the plastic receiving opening with the radius of the curve lying on the side of said receiving opening toward said discharge opening connected thereto and a second segment extending from said discharge opening with the radius of the curve lying on the side of said discharge opening toward said receiving opening.

3. The invention as defined in claim 2 wherein the axis of each curved segment is substantially the arc of a circle.

4. The invention as defined in claim 2 further characterized by nozzle means operatively connected to said head, each nozzle having an axial bore communicating with a passage, and wherein the axis of each of said passages is coaxial with the axis of the nozzle means bore at the discharge opening of the passage.

* * * * *